United States Patent [19]

Indeck et al.

[11] Patent Number: 5,365,586
[45] Date of Patent: Nov. 15, 1994

[54] METHOD AND APPARATUS FOR FINGERPRINTING MAGNETIC MEDIA

[75] Inventors: Ronald S. Indeck, Olivette; Marcel W. Muller, St. Louis, both of Mo.

[73] Assignee: Washington University, St. Louis, Mo.

[21] Appl. No.: 46,040

[22] Filed: Apr. 9, 1993

[51] Int. Cl.⁵ .................. G11B 23/28; H04K 1/00; H04L 9/00; G06K 7/08
[52] U.S. Cl. ........................................ 380/3; 380/4; 380/23; 380/25; 235/440; 235/380; 235/437; 235/448; 235/449
[58] Field of Search ................. 380/23, 25, 3, 4; 235/440, 380, 437, 448, 449

[56] References Cited

U.S. PATENT DOCUMENTS

| | | |
|---|---|---|
| 4,038,596 | 7/1977 | Lee ........................................ 235/449 |
| 4,806,740 | 2/1989 | Gold et al. . | 
| 4,906,988 | 3/1990 | Copella .................................. 235/449 |
| 4,985,614 | 1/1991 | Pease et al. ........................... 235/440 |
| 5,027,113 | 6/1991 | Bonnaval-Lamothe et al. ... 235/380 |
| 5,177,344 | 1/1993 | Pease ..................................... 235/449 |

OTHER PUBLICATIONS

*Noise Correlation of Magnetic Thin Film Media* by Mian, Indeck, and Muller. *Japanese Journal of Applied Physics*, vol. 30, No. 8B, Aug., 1991, pp. L1483–L1485.

*Determination of a Track's Edge by Differential Power Spectrum* by Indeck, Mian, and Muller. *Jpn. J. Appl. Phys.*, vol. 31 (1992) pp. L1065–L1067.

*Spatial Noise Phenomena of Longitudinal Magnetic Recording Media*, by Hoinville, Indeck, Muller. *IEEE Transactions on Magnetics*, vol. 28, No. 6, Nov. 1992.

*Measurements and Modeling of Noise in DC–Erased Thin–Film Media*, by Vos, Tanaka, Judy. *IEEE Transactions on Magnetics*, vol. 26, No. 5, Sep. 1990.

*Spatial Structure of Media Noise In Film Disks*, Yarmchuk. *IEEE Transactions on Magnetics*, vol. Mag-22, No. 5, Sep. 1986.

*Noise From Unsaturated DC Erasure and Peak Shift of Signals*, Ohara, Sato. *IEEE Transactions on Magnetics*, vol. Mag-23, No. 5, Sep. 1987.

*Novel Applications of Cryptography in Digital Communications*, by Omura. *IEEE Communications Magazine*, pp. 21–29, May 1990.

*A Physically Based Approach to Information Theory for Thin Film Magnetic Recording*, by O'Sullivan, Porter, Indeck, Muller. *Proceedings of the Thirtieth Allerton Conference on Communication, Control, and Computing*, Oct. 1992.

*Transverse Correlation Length in Thin Film Media*, by Mian, Indeck, Muller. *IEEE Transactions on Magnetics*, vol. 28, No. 5, pp. 2733–2735, Sep. 1992.

*A Magnetoresistive Gradiometer*, by Indeck, Judy, Iwasaki. *IEEE Transactions on Magnetics*, vol. 24, No. 6, pp. 2617–2619, Nov. 1988.

(List continued on next page.)

*Primary Examiner*—David C. Cain
*Attorney, Agent, or Firm*—Rogers, Howell & Haferkamp

[57] ABSTRACT

A method and apparatus is disclosed for determining the remanent noise in a magnetic medium by DC saturation of a region thereof and measurement of the remaining DC magnetization. A conventional magnetic recording transducer may be used to determine the remanent noise. Upon determination, the remanent noise may then be digitized and recorded on the same magnetic medium to thereby "fingerprint" the magnetic medium. This "fingerprint" may then be later used to verify and authenticate the magnetic medium as being an original. In such manner, any magnetic medium, or any object having an associated magnetic medium, may be "fingerprinted" including credit cards, computer programs, compact discs, videotapes, cassette tapes, etc.

122 Claims, 1 Drawing Sheet

OTHER PUBLICATIONS

*An Analysis of Multilayered Thin-Film Magnetic Field Gradiometers Having a Superconducting Spacer,* by Indeck. *Journal of The Magnetics Society of Japan,* vol. 13, Supplement, No. S1 pp. 599–604 (1989).

*Interaction Factors of a Multi-Layered Magnetic Thin Film System,* by Mian, Indeck. *IEEE Transactions on Magnetics,* vol. 26, No. 5, pp. 2415–2417, Sep. 1990.

*An interaction matrix for the energy analysis of an n-layered magnetic thin-film system,* by Mian, Indeck. *Journal of Magnetism and Magnetic Materials,* 96 (1991) 248–260.

*dc track edge interactions,* by Indeck, Reising, Hoinville, Muller. *Journal of Applied Physics,* 69 (8), pp. 4721–4723, 15 Apr. 1991.

*Track edge fluctuations,* by Muller, Indeck. *Journal of Applied Physics,* 67 (9), pp. 4683–4685, 1 May 1990.

*In Situ Measurement of the Remanence Curve of Magnetic Recording Media,* by Hoinville, Ornes, Murdock, Muller. *IEEE Transactions on Magnetics,* vol. 24, No. 6, pp. 2976–2978, Nov. 1988.

*An in situ measurement of intergranular coupling in magnetic film media,* by Mian, Indeck, Muller. *Journal of Applied Physics,* 73 (4), pp. 2027–2028, 15 Feb. 1993.

*Noise Characterization of Perpendicular Media,* by Indeck, Johnson, Mian, Hoinville, Muller. *Journal of the Magnetics Society of Japan,* vol. 15 Supplement, No. S2, pp. 173–178 (1991).

METHOD AND APPARATUS FOR FINGERPRINTING MAGNETIC MEDIA

BACKGROUND AND SUMMARY OF THE INVENTION

The sources of noise in a readback signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its determination. The inventors herein have recently demonstrated that this noise component is instead deterministic, i.e. is permanent and repeatable, depending entirely on the head-medium position and on the magnetic history of the medium. As confirmed by experiments conducted by the inventors herein, when the medium has had no signal written on it and has been recorded only with DC fields, the observed readback signals are almost identical. The magnetic contribution to the readback signal under these conditions results from spatial variations in the medium's magnetization: magnetic domains, ripple, local fluctuations of the anisotropy field and saturation magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine its remanent state or remanent noise. The inventors have confirmed that this remanent noise is a function of the magnetic microstructure by comparing the remanent noise after a positive DC saturation with the remanent noise after a negative DC saturation. It has been found that these wave forms are virtual "mirror images" of each other thereby demonstrating a close correlation. Similarly, other methodologies were used to confirm that the remanent noise was determinative, repeatable, and related to the physical microstructure of the magnetic medium itself. Remanent noise arising from the permanent microstructure exhibits identifiable features characteristic of that permanent microstructure after practically any magnetic history. See Spatial Noise Phenomena of Longitudinal Magnetic Recording Media by Hoinville, Indeck and Muller, *IEEE Transactions on Magnetics*, Volume 28, No. 6, November 1992, the disclosure of which is incorporated herein by reference.

There is a long felt need in the art for a method and apparatus to identify or fingerprint various kinds of documents as well as the wide variety of prerecorded magnetic media presently being marketed and/or distributed in the United States and throughout the world. Examples of these magnetic media include that produced and sold in the entertainment industry including magneto-optic discs and tapes, cassette tapes, reel to reel tapes, videotapes, etc. Still another major market in magnetic media is the tremendous volume of computer programs routinely sold and/or distributed on floppy diskettes. Magnetic media are also used for other purposes for which it is important to be able to identify and authenticate originals including videotapes, cassette tapes, and other prerecordings on magnetic media of telephone conversations, video recordings of criminal activities, and other such investigative and documentary uses. Still another example of a need in the art for authentication and verification of magnetic media lies in the magnetic data card field. Examples of magnetic data cards include the well known credit card as well as ATM cards, debit cards, security or ID cards, mass transit cards, and even airline tickets or other vouchers which have magnetic stripes thereon for the magnetic recording of data. As well known in the art, virtually every magnetic data card has a magnetic stripe of prerecorded magnetic data which is used to record the customer's account number or some other such identifing data. Tremendous sums of money are lost annually through forgery and other fraudulent copying and use schemes which could be virtually eliminated if an apparatus and methodology could be implemented for reliably authenticating and verifying the originality of a magnetic data card prior to its being approved for its associated transaction. Still other examples extend to paper documents and the like for which there has been some specific efforts of which the inventors herein are aware.

As related in an article entitled Novel Applications of Cryptography in Digital Communications by Omura, *IEEE Communications Magazine*, May 1990, a technique is disclosed for creating counterfeit proof objects. As related therein, the basic idea is to measure some unique "fingerprint" of the paper and to sign (encrypt) it using the secret key of the manufacturer of, for example, a stock certificate. The fingerprint is obtained by moving a narrow intense light beam along a line on the paper and measuring the light intensity that passes through the paper. The light intensity function determined by the unique random pattern of paper fibers along the line then forms the fingerprint of the particular piece of paper. This fingerprint is then digitized and encrypted by the secret encryption function. The encrypted fingerprint is then separately printed onto the paper in digital form such as a bar code. At a later date, the authenticity of the stock certificate may be verified by using a nonsecret public decryption function to decrypt the encrypted data on the paper and reconstruct the intensity function, or fingerprint, that was recorded thereon. Next, the actual intensity function of the stock certificate is measured. If this newly measured intensity function agrees with the intensity function reconstructed from the decrypted data, the document may be declared authentic. This scheme takes advantage of a well know secrecy system referred to as a public key cryptosystem. This system employs a trap door one way function. A user randomly chooses a secret key (the trap door) and after applying the trap door one way function to the data, it determines an algorithm used for decoding which is made publicly known. The trap door one way function is also used to produce the encrypted message. Then every other user can understand the original message by applying the algorithm to the cryptogram. In this system no one else can produce a publicly readable message attributable to the original user's trap door as only the user has knowledge of that algorithm. This prevents the simplistic forgery attempt of changing the pre-recorded fingerprint to agree with a forged document's fingerprint.

Still another example of an attempt in the prior art to fingerprint or counterfeit-proof objects is shown in U.S. Pat. No. 4,806,740. As shown therein, an object, such as a stock certificate, has deposited thereon a stripe of magnetic medium having a variable density resulting from the non-uniformity of the paper, the process of depositing the magnetic medium on the document, and the dispersion of magnetic particles within the medium. The density variations are randomly created as the magnetic medium is applied, which affords a unique document as these density variations are fixed and repeatable to identify the document. A second magnetic stripe is also applied to the document, but this magnetic stripe is comprised of a medium that is tightly specified and highly controlled in accordance with well known standards in the recording art to be part of a magnetic read/write system. In operation, the non-uniform magnetic stripe is erased, recorded by a standard recording comprised of a linear DC signal or a linear AC signal or a linear bias signal. After recording, another head senses the magnetic characteristic of the recorded magnetic stripe which is translated into a digital, machine readable format, and then separately recorded on the second magnetic stripe in a simple write function. For authentication, the stock certificate is passed under another set of heads which first reads the digitally recorded machine readable representation of the sensed noise signal and then a second set of heads reads the variable density magnetic stripe by first erasing it, recording the same standard noise function, and then sensing the output of the prerecorded noise function as it is "distorted" by the variable density magnetic stripe. If it matches the recorded representation thereof, then the document is declared to be authentic and original. Thus, with the method of the '740 patent, a pair of magnetic stripes must be applied to the document and a specified signal (denominated as noise) must be recorded, measured, and then its output digitally recorded. Furthermore, one of the magnetic stripes must be applied in other than recording industry standard and in a random manner to ensure the randomness of the output thereof. These steps make the '740 patent method difficult and inconvenient to implement.

In order to solve these and other problems in the prior art, the inventors herein have developed a method and apparatus for utilizing the unique, deterministic, remanent noise characteristic of the magnetic medium itself to fingerprint not only documents, but other objects and more importantly, the magnetic medium itself so that it can be identified and authenticated. This inventive technique relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the microstructure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations. The actual deviations will be unique to a region of the medium's surface making this orientation a signature or a "fingerprint" of that medium. To reproduce this distribution, intentionally or not, is practically impossible since this would entail a precise manipulation of the orientation of innumerable particles at the submicrometer level. Thus, the orientation of a large set of particles on a specific portion of a recording surface can uniquely identify that medium. In experiments, the inventors have found that the remanent noise from a length of between about 30 micrometers and 4300 micrometers provides enough data to "fingerprint" a magnetic medium.

In essence, the present invention is elegantly simple and adapted for implementation by conventional recording heads as are commonly found and used in virtually every read or read/write device presently utilized by the public at large. Such examples include credit card readers, magneto-optic disc players, cassette players, VCRs and personal computers. In its simplest implementation, a conventional recording head need merely DC saturate a specified portion of a magnetic medium, and then "read" or "play back" the remanent noise which remains. Alternatively, the fingerprint can be obtained from the region between two recorded magnetic transitions. This remanent noise, which is an analog signal, may then be digitized and recorded, in the medium itself or elsewhere, in machine readable format using a trap door function. Thusly, the magnetic medium has become "labeled" with its fingerprint. Verification or authentication of that magnetic medium is simply achieved by reversing this process except that the digitally recorded fingerprint must be decrypted using the publicly known key. Should the measured remnant noise match the remanent noise as recorded, the magnetic medium is authenticated.

There are many variations in utilization of the inventors' method and apparatus which expand its universe of applications. For example, some applications need not require the use of a trap door function such as, for example, when the encoded objects are not publicly distributed and instead are being identified solely for the user's purposes. One such example would be for use with inventory items.

Still another application involves the "copy protection" of mass distributed application software. Over the years, many schemes have been tried and almost uniformly abandoned for copy protecting publicly distributed diskettes of prerecorded software. This is for many reasons including the problem that almost all of the copy protection schemes previously implemented interfere with the running of the software on the user's computer. With the present invention, a copy protection scheme may be implemented which does not interfere with the running of the software and instead merely provides a precondition to running of what is otherwise normally written code. In its implementation, a software diskette may first instruct the computer in which it is inserted to read a fingerprint of a specified portion of the diskette and compare it with a prerecorded version of the same fingerprint. If the fingerprints match, then the software may permit the computer to further read and implement the application software stored thereon. However, if the fingerprint detected by the computer does not match that which is stored in the software, then the software itself may inhibit further reading of the program and prevent its implementation. This would absolutely prevent a user from making a copy of a program for use by someone else. This scheme may also be slightly modified to permit a user to make a single archive or backup copy such that the fingerprint comparison permits the first non-matching fingerprint copy to be run but then prevents any other non-matching fingerprinted copies to run. This implementation is easily achieved and "copy protects" application software reliably, inexpensively, and does not require hardware changes to the massive number of computers already in consumers' hands.

Still another significant application of the present invention involves authenticating credit cards using the single magnetic stripe already implemented on most major credit cards. The same method would be used as explained above to measure and record the "fingerprint" of the particular magnetic stripe contained on a particular credit card and then a credit card reader would require that same fingerprint to be matched every time it is used to verify its authenticity. While there are already a large number of credit cards in circulation, these cards are routinely subject to expiration such that there is a continual replacement of these cards in the public's hands. Thus, over time the installed base of credit cards could be readily transformed to those which have been "fingerprinted".

While the principal advantages and features of the invention have been described above, and a number of examples given, a greater understanding of the invention may be attained by referring to the drawings and the description of the preferred embodiment which follow.

DETAILED DESCRIPTION OF THE PREFERRED EMBODIMENT

Figure 1:
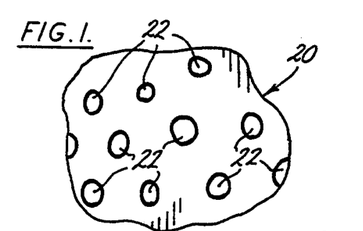
FIG. 1 is a magnified representative depiction of the microscopic structure of a region of magnetic medium.
Figure 2:
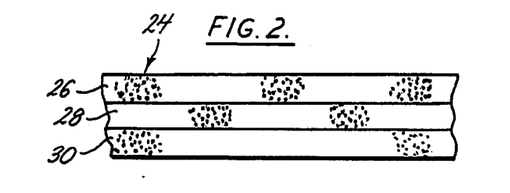
FIG. 2 is a magnified depiction of several tracks of a magnetic medium having microscopic structure representatively shown thereon.

As shown in FIG. 1, a region of magnetic medium 20 is built up with a plurality of microcrystalline structures 22 in a random pattern. This microcrystalline structure 22 is comprised of particles or grains varying from hundreds to thousands of Angstroms in diameter. The view of FIG. 1 is greatly enlarged and magnified in order to depict this physical phenomenon. As shown in FIG. 2, this microcrystalline structure extends throughout the magnetic medium even though the magnetic medium 24 shown in FIG. 2 may be itself comprised of tracks 26, 28, 30 as well known in the art. Although shown schematically as separate regions, the fingerprint can be obtained from any portion of the medium 24.

Figures 3, 4, 5:
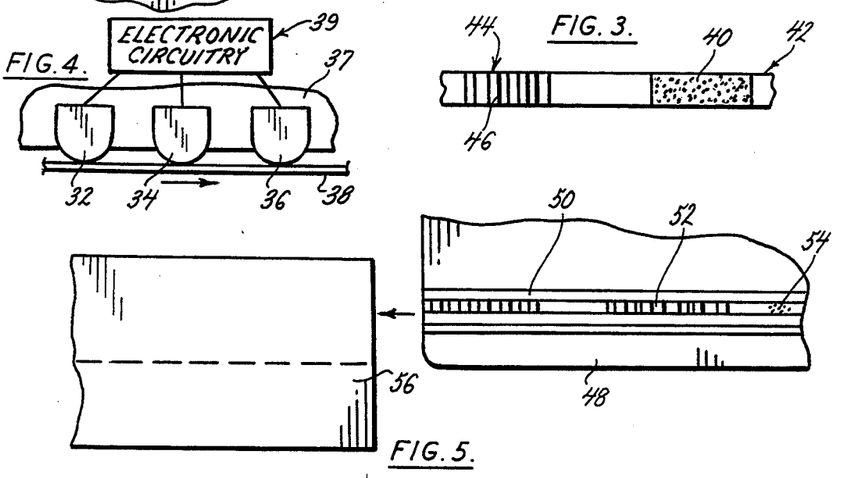
FIG. 3 is a partial view of a track of magnetic media having its fingerprint recorded thereon in machine readable bar code.
FIG. 4 depicts three conventional recording heads and a magnetic medium traveling thereunder.
FIG. 5 is a view of a credit card having fingerprint data encoded thereon for reading by a credit card reader.

Referring now to FIGS. 3 and 4, a plurality of conventional recording heads 32, 34, 36 are shown mounted in a head transport 37 with a traveling magnetic medium 38 controllably driven past recording heads 32, 34, 36 all as is well known in the art. These recording heads 32–36 may be any magnetic transducer or magneto-optic transducer head, as known in the art. Recording heads 32–36 are all connected to electronic circuitry 39, as well known in the art, to control 7 and read their input and output and to further process signals for playback or other use. Although only three heads 32, 34, 36 are being shown in FIG. 4, it will be well understood to those of ordinary skill in the art that a plurality of recording heads of any number may just as easily be provided and, as taught herein, may be required in order to effect the purposes of the present invention. As shown in FIG. 3, the magnetic "fingerprint" at a specified region 40 of a thin film magnetic medium or tape 42, shown representationally in FIG. 3 as a thin film tape, may be recorded at a second position 44 on said thin film magnetic medium or tape 42 in a digitized, machine readable bar code 46 or the like.

As their preferred embodiment, the inventors have utilized a methodology for reading or determining the remanent noise characteristic of the region 40 of the magnetic medium which is being "fingerprinted". Preferably, this region 40 is on the order of several hundreds of micrometers. This region is then DC saturated and then subjected to a "read" step for determining the remanent noise produced thereby.

While this is the preferred embodiment, it should be understood that the fingerprint is always there, whether the medium has been recorded over or not. Therefore, it is not strictly necessary that the specified portion of medium containing the fingerprint be DC saturated, or DC saturated in the same polarity in order to obtain the fingerprint. Instead, it is only important that the remanent noise be determined in a manner which facilitates its being correlated successfully with the earlier determined remanent noise.

If this information is obtained in a "single shot" measurement, then the results will obviously include both electronics noise as well as the remanent noise attributable to the particles' orientation. As this "noise" or "remanent noise" is electronically determined as an analog signal, this information may then be digitized and recorded with about a hundred to two hundred digital bits of information as may be representationally shown as bar code 46 in FIG. 3. In experiments, the inventors have made multiple measurements and averaged their results in order to eliminate the electronics noise present in the measured wave form. However, there was observed a high correlation coefficient when the two sets of data, i.e. single shot and averaged, were compared thereby demonstrating that a single shot reading could readily be used in comparison to an averaged set of data in commercial application.

In order to recover or measure the "fingerprint" or remanent noise, the process is similarly repeated and, when comparing two single shot wave forms, a smaller correlation therebetween was experienced. However, the correlation experienced with two single shot wave forms was significant and clearly demonstrated this method's feasibility for commercial application as well.

As shown in FIG. 5, a practical implementation for the subject invention includes a magnetic data card 48 which has a magnetic stripe 50 thereon with magnetic stripe 50 being encoded with a bar code 52 representative of a fingerprint of a region 54 of magnetic stripe 50. Thus, as the magnetic data card 48 is "swiped" through a card reader 56, the card reader 56 may read the bar code 52 to determine the stored fingerprint data, read the fingerprint at region 54 of the magnetic stripe 50, compare them for a match, and if they match then authenticate magnetic data card 48 as a genuine card which has not been altered and which may be approved. Alternatively, the fingerprint need not be stored on the card but may instead be stored in a data base elsewhere.

Figure 6:
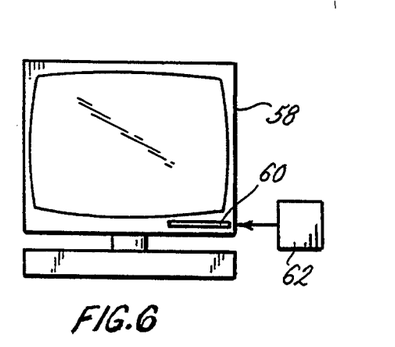
FIG. 6 depicts a personal computer with a computer diskette for insertion in a floppy disk drive thereof.

As shown in FIG. 6, a computer 58 has a floppy disk drive 60 for reading floppy diskettes 62, all as is well known in the art. As still another implementation of the inventors' device, the software recorded on floppy diskette 62 may first require that the floppy disk drive 60 read a designated region of the magnetic medium comprising floppy diskette 62 to determine its fingerprint, compare that fingerprint with the fingerprint stored in the program resident in floppy diskette 62, and if they match permit computer 58 to run the application program stored on floppy diskette 62. If the program stored on floppy diskette 62 is not the original floppy diskette, then the application program will not be run as the measured fingerprint will not match the fingerprint stored in data contained in the floppy diskette 62. In a variation of this implementation, a single, archival, copy of floppy diskette 62 may be permitted should the program resident in floppy diskette 62 allow it to run if the measured fingerprint is either a match with the fingerprint stored, or is its first non-match. The non-match fingerprint would then also be stored in the application software resident in floppy diskette 62 such that the program would recognize the original floppy diskette 62 and a second floppy diskette as used by a user to create this backup, archival, copy.

Figure 7:
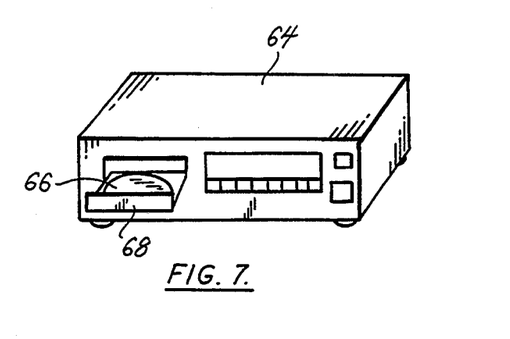
FIG. 7 is a perspective view of a magneto-optic disc player with a magneto-optic disc in its tray.

In still another implementation of the present invention, a magneto-optic disc player 64 has a disc 66 placed in its tray 68 and ready for play upon retraction of tray 68. However, disc 66 may have its fingerprint stored to match the disc medium. Should magneto-optic disc player 64 have the appropriate circuitry for preconditioning play of disc 66 with a comparison of the measured and recorded fingerprints, unauthorized copying of disc 66 may be prevented. Similarly, any taped copies made from disc 66 would necessarily have the incorrect fingerprint stored therein and its subsequent play would also be prohibited should the tape playback unit have an appropriate circuit for preconditioning play based on matching stored and measured fingerprints.

Figure 8:
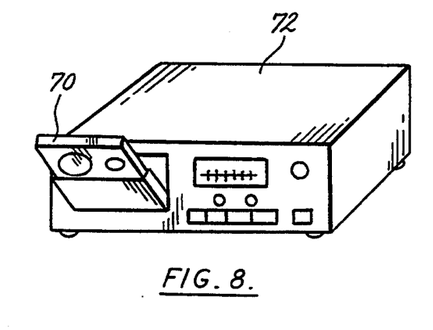
FIG. 8 is a cassette player depicting a cassette tape for play therein.

As shown in FIG. 8, still another implementation of the invention includes measuring and storing the appropriate fingerprint on a cassette or digital tape 70, with a cassette tape player 72 having the necessary circuitry for measuring and comparing the recorded and measured fingerprints to pre-condition play, as explained above.

Figure 9:
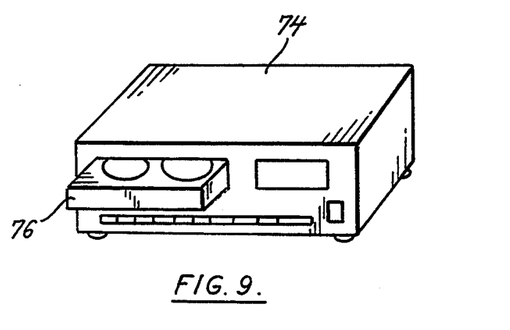
FIG. 9 is a perspective view of a VCR with a tape ready for insertion.

In still another implementation of the present invention, as shown in FIG. 9 a VCR 74 has a VCR tape 76 ready for insertion therein. Using the present invention, a fingerprint can readily be measured and encoded onto the VCR tape for comparison by appropriate circuitry contained within VCR 74. Thus, if appropriately configured, the VCR would not play back a tape unless it was authentic or original.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A device for fingerprinting an object for the later determination of its identity, said object including at least in part, a magnetic medium portion, said device having means for determining a remanent noise for said medium portion, said remanent noise comprising the fingerprint for said object, and means for recording said remanent noise for later comparison with the later determination of said remanent noise to thereby identify said object.

2. The device of claim 1 wherein said recording means has means for recording said fingerprint on said object.

3. The device of claim 2 wherein said recording means includes means for recording said remanent noise in said magnetic medium portion in machine readable form.

4. The device of claim 3 further comprising means for encrypting said remanent noise prior to its being recorded by said recording means.

5. The device of claim 4 wherein said object is a magnetic data card, and said magnetic medium portion is a magnetic stripe on said magnetic data card.

6. The device of claim 5 wherein said remanent noise is encrypted with a trap door function.

7. The device of claim 5 wherein said object is a computer diskette, and said magnetic medium portion comprises a portion of said computer diskette.

8. The device of claim 7 wherein said remanent noise is encrypted with a trap door function.

9. The device of claim 5 wherein said object is a magneto-optic disc, and said magnetic medium portion comprises a portion of said magneto-optic disc.

10. The device of claim 9 wherein said remanent noise is encrypted with a trap door function.

11. The device of claim 5 wherein said object is a magnetic recording tape, and said magnetic medium portion comprises a portion of said magnetic recording tape.

12. The device of claim 11 wherein said remanent noise is encrypted with a trap door function.

13. The device of claim 2 wherein said magnetic medium portion comprises a label affixed to said object.

14. An object having its fingerprint recorded for the later verification of its identity, said object having a magnetic medium portion, said fingerprint comprising a remanent noise for said magnetic medium portion.

15. The object of claim 14 wherein said fingerprint is recorded on said object.

16. The object of claim 15 wherein said remanent noise is recorded in said magnetic medium portion in machine readable form.

17. The object of claim 16 wherein said remanent noise is encrypted prior to its being recorded on said object.

18. The object of claim 14 wherein said object is a magnetic data card, and said magnetic medium portion is a magnetic stripe on said magnetic data card.

19. The object of claim 18 wherein said remanent noise is encrypted with a trap door function.

20. The object of claim 14 wherein said object is a computer diskette, and said magnetic medium portion comprises a portion of said computer diskette.

21. The object of claim 20 wherein said remanent noise is encrypted with a trap door function.

22. The object of claim 14 wherein said object is a magneto-optic disc, and said magnetic medium portion comprises a portion of said magneto-optic disc.

23. The object of claim 22 wherein said remanent noise is encrypted with a trap door function.

24. The object of claim 14 wherein said object is a magnetic recording tape, and said magnetic medium portion comprises a portion of said magnetic recording tape.

25. The object of claim 24 wherein said remanent noise is encrypted with a trap door function.

26. The object of claim 14 wherein said magnetic medium portion comprises a label affixed to said object.

27. The device of claim 1 wherein said determining means includes means for DC saturating a region of said magnetic medium and means for reading a residual voltage over said region, said residual voltage comprising said remanent noise.

28. The device of claim 27 wherein said region comprises a linear portion extending between about 30 micrometers and about 4300 micrometers.

29. The device of claim 27 wherein said determining means further comprises means for averaging a plurality of residual voltage readings, said average comprising said fingerprint.

30. The device of claim 1 wherein said determining means comprises a conventional magnetic recording head.

31. A device for authenticating an object having a fingerprint recorded, said object having a magnetic medium portion, said fingerprint comprising a remanent noise for said medium portion, said device including means for reading said recorded fingerprint, means for translating said remanent noise from said fingerprint, means for determining a remanent noise directly from said magnetic medium portion, and means for comparing said translated remanent noise with said determined remanent noise to determine whether they match, thereby authenticating said object.

32. The device of claim 31 wherein said object has its fingerprint recorded thereon.

33. The device of claim 31 wherein said fingerprint is recorded in said magnetic medium portion in machine readable form.

34. The device of claim 33 wherein said fingerprint is encrypted, and said translation means includes means for de-crypting said fingerprint.

35. The device of claim 34 wherein said object is a magnetic data card, said magnetic medium portion is a magnetic stripe on said magnetic data card.

36. The device of claim 35 wherein said remanent noise is encrypted with a trap door function.

37. The device of claim 31 wherein said object is a computer diskette, and said magnetic medium portion comprises a portion of said computer diskette.

38. The device of claim 37 wherein said remanent noise is encrypted with a trap door function.

39. The device of claim 31 wherein said object is a magneto-optic disc, and said magnetic medium portion comprises a portion of said magneto-optic disc.

40. The device of claim 39 wherein said remanent noise is encrypted with a trap door function.

41. The device of claim 31 wherein said object is a magnetic recording tape, and said magnetic medium portion comprises a portion of said magnetic recording tape.

42. The device of claim 40 wherein said remanent noise is encrypted with a trap door function.

43. The device of claim 31 wherein said magnetic medium portion comprises a label affixed to said object.

44. A method for authenticating an object, said object including at least in part a magnetic medium portion, said object having a fingerprint recorded, said fingerprint comprising a previously determined remanent noise for said medium portion, said method comprising the steps of:
   determining a remanent noise directly from said medium portion,
   reading said fingerprint, and
   comparing said determined remanent noise with said fingerprint.

45. The method of claim 44 wherein said fingerprint comprises a machine readable representation of said previously determined remanent noise, and the step of reading includes the step of reading said fingerprint with a machine.

46. The method of claim 45 wherein said fingerprint comprises an encrypted representation of said previously determined remanent noise, and further comprising the step of de-crypting said fingerprint.

47. A method for fingerprinting an object for the later determination of its identity, said object including at least in part a magnetic medium portion, said method comprising the steps of determining a remanent noise for said medium portion, said remanent noise comprising said fingerprint, and recording said fingerprint on said object for the later comparison thereof with the later determination of said remanent noise.

48. The method of claim 47 further comprising the step of encrypting said fingerprint prior to recording.

49. A device for fingerprinting an object for the later determination of its identity, said object including at least in part, a magnetic medium portion, said device having means for determining a ramanent noise for a length of no more than about several hundreds of micrometers of said medium portion, said ramanent noise comprising the fingerprint for said object, and means for recording said remanent noise for later comparison with the later determination of said remanent noise to thereby identify said object.

50. The device of claim 49 wherein said recording means has means for recording said fingerprint on said object.

51. The device of claim 50 wherein said recording means includes means for recording said remanent noise in said magnetic medium portion in machine readable form.

52. The device of claim 51 further comprising means for encrypting said remanent noise prior to its being recorded by said recording means.

53. The device of claim 52 wherein said object is a magnetic data card, and said magnetic medium portion is a magnetic stripe on said magnetic data card.

54. The device of claim 51 wherein said object is a computer diskette, and said magnetic medium portion comprises a portion of said computer diskette.

55. A device for fingerprinting an object for the later determination of its identity, said object including at least in part, a magnetic medium portion, said device having means for determining a remanent noise from a magnetic micro-structure for said medium portion, said remanent noise comprising the fingerprint for said object, and means for recording said remanent noise for later comparison with the later determination of said remanent noise to thereby identify said object.

56. The device of claim 55 wherein said recording means has means for recording said fingerprint on said object.

57. The device of claim 56 wherein said recording means includes means for recording said remanent noise in said magnetic medium portion in machine readable form.

58. The device of claim 57 further comprising means for encrypting said remanent noise prior to its being recorded by said recording means.

59. The device of claim 58 wherein said object is a magnetic data card, and said magnetic medium portion is a magnetic stripe on said magnetic data card.

60. The device of claim 57 wherein said object is a computer diskette, and said magnetic medium portion comprises a portion of said computer diskette.

61. A device for fingerprinting an object for the later determination of its identity, said object including at least in part, a uniformly manufactured magnetic medium portion, said device having means for determining a remanent noise for said medium portion, said remanent noise comprising the fingerprint for said object, and means for recording said remanent noise for later comparison with the later determination of said remanent noise to thereby identify said object.

62. The device of claim 61 wherein said recording means has means for recording said fingerprint on said object.

63. The device of claim 62 wherein said recording means includes means for recording said remanent noise in said magnetic medium portion in machine readable form.

64. The device of claim 63 wherein said object is a magnetic data card, and said magnetic medium portion is a magnetic stripe on said magnetic data card.

65. The device of claim 63 wherein said object is a computer diskette, and said magnetic medium portion comprises a portion of said computer diskette.

66. An object having its fingerprint recorded for the later verification of its identity, said object having a magnetic medium portion, said fingerprint comprising a remanent noise for no more than about several hundreds of micrometers of said magnetic medium portion.

67. The object of claim 66 wherein said fingerprint is recorded on said object.

68. The object of claim 67 wherein said remanent noise is recorded in said magnetic medium portion in machine readable form.

69. The object of claim 68 wherein said remanent noise is encrypted prior to its being recorded on said object.

70. The object of claim 68 wherein said object is a magnetic data card, and said magnetic medium portion is a magnetic stripe on said magnetic data card.

71. The object of claim 68 wherein said object is a computer diskette, and said magnetic medium portion comprises a portion of said computer diskette.

72. The object of claim 68 wherein said object is a magnetic recording tape, and said magnetic medium portion comprises a portion of said magnetic recording tape.

73. An object having its fingerprint recorded for the later verification of its identity, said object having a magnetic medium portion, said fingerprint comprising a remanent noise from a magnetic micro-structure for said magnetic medium portion.

74. The object of claim 73 wherein said fingerprint is recorded on said object.

75. The object of claim 74 wherein said remanent noise is recorded in said magnetic medium portion in machine readable form.

76. The object of claim 75 wherein said remanent noise is encrypted prior to its being recorded on said object.

77. The object of claim 75 wherein said object is a magnetic data card, and said magnetic medium portion is a magnetic stripe on said magnetic data card.

78. The object of claim 75 wherein said object is a computer diskette, and said magnetic medium portion comprises a portion of said computer diskette.

79. The object of claim 75 wherein said object is a magnetic recording tape, and said magnetic medium portion comprises a portion of said magnetic recording tape.

80. An object having its fingerprint recorded for the later verification of its identity, said object having a uniformly manufactured magnetic medium portion, said fingerprint comprising a remanent noise for said magnetic medium portion.

81. The object of claim 80 wherein said fingerprint is recorded on said object.

82. The object of claim 81 wherein said remanent noise is recorded in said magnetic medium portion in machine readable form.

83. The object of claim 82 wherein said remanent noise is encrypted prior to its being recorded on said object.

84. The object of claim 82 wherein said object is a magnetic data card, and said magnetic medium portion is a magnetic stripe on said magnetic data card.

85. The object of claim 82 wherein said object is a computer diskette, and said magnetic medium portion comprises a portion of said computer diskette.

86. The object of claim 82 wherein said object is a magnetic recording tape, and said magnetic medium portion comprises a portion of said magnetic recording tape.

87. A device for authenticating an object having a fingerprint recorded, said object having a magnetic medium portion, said fingerprint comprising a remanent noise for a length of no more than about several hundreds of micrometers of said medium portion, said device including means for reading said recorded fingerprint, means for translating said remanent noise from said fingerprint, means for determining a remanent noise directly from said magnetic medium portion, and means for comparing said translated remanent noise with said determined remanent noise to determine whether they match, thereby authenticating said object.

88. The device of claim 87 wherein said object has its fingerprint recorded thereon.

89. The device of claim 87 wherein said fingerprint is recorded in said magnetic medium portion in machine readable form.

90. The device of claim 89 wherein said fingerprint is encrypted, and said translation means includes means for decrypting said fingerprint.

91. The device of claim 90 wherein said object is a magnetic data card, said magnetic medium portion is a magnetic stripe on said magnetic data card.

92. The device of claim 87 wherein said object is a computer diskette, and said magnetic medium portion comprises a portion of said computer diskette.

93. The device of claim 87 wherein said object is a magnetic recording tape, and said magnetic medium portion comprises a portion of said magnetic recording tape.

94. A device for authenticating an object having a fingerprint recorded, said object having a magnetic medium portion, said fingerprint comprising a remanent noise from a magnetic micro-structure for said medium portion, said device including means for reading said recorded fingerprint, means for translating said remanent noise from said fingerprint, means for determining a remanent noise directly from said magnetic medium portion, and means for comparing said translated remanent noise with said determined remanent noise to determine whether they match, thereby authenticating said object.

95. The device of claim 94 wherein said object has its fingerprint recorded thereon.

96. The device of claim 94 wherein said fingerprint is recorded in said magnetic medium portion in machine readable form.

97. The device of claim 96 wherein said fingerprint is encrypted, and said translation means includes means for decrypting said fingerprint.

98. The device of claim 97 wherein said object is a magnetic data card, said magnetic medium portion is a magnetic stripe on said magnetic data card.

99. The device of claim 94 wherein said object is a computer diskette, and said magnetic medium portion comprises a portion of said computer diskette.

100. The device of claim 94 wherein said object is a magnetic recording tape, and said magnetic medium portion comprises a portion of said magnetic recording tape.

101. A device for authenticating an object having a fingerprint recorded, said object having a uniformly manufactured magnetic medium portion, said fingerprint comprising a remanent noise for said medium portion, said device including means for reading said recorded fingerprint, means for translating said remanent noise from said fingerprint, means for determining a remanent noise directly from said magnetic medium portion, and means for comparing said translated remanent noise with said determined remanent noise to determine whether they match, thereby authenticating said object.

102. The device of claim 101 wherein said object has its fingerprint recorded thereon.

103. The device of claim 101 wherein said fingerprint is recorded in said magnetic medium portion in machine readable form.

104. The device of claim 103 wherein said fingerprint is encrypted, and said translation means includes means for decrypting said fingerprint.

105. The device of claim 104 wherein said object is a magnetic data card, said magnetic medium portion is a magnetic stripe on said magnetic data card.

106. The device of claim 101 wherein said object is a computer diskette, and said magnetic medium portion comprises a portion of said computer diskette.

107. The device of claim 101 wherein said object is a magnetic recording tape, and said magnetic medium portion comprises a portion of said magnetic recording tape.

108. A method for authenticating an object, said object including at least in part a magnetic medium portion, said object having a fingerprint recorded, said fingerprint comprising a previously determined remanent noise for a length of no more than about several hundreds of micrometers of said medium portion, said method comprising the steps of:
determining a remanent noise directly from said medium portion,
reading said fingerprint, and
correlating said determined remanent noise with said fingerprint, said correlation thereby indicating if said object is authentic.

109. The method of claim 108 wherein said fingerprint comprises a machine readable representation of said previously determined remanent noise, and the step of reading includes the step of reading said fingerprint with a machine.

110. The method of claim 109 wherein said fingerprint comprises an encrypted representation of said previously determined remanent noise, and further comprising the step of decrypting said fingerprint.

111. A method for authenticating an object, said object including at least in part a magnetic medium portion, said object having a fingerprint recorded, said fingerprint comprising a previously determined remanent noise from a magnetic micro-structure for said medium portion, said method comprising the steps of:
determining a remanent noise directly from said medium portion,
reading said fingerprint, and
correlating said determined remanent noise with said fingerprint, said correlation thereby indicating if said object is authentic.

112. The method of claim 111 wherein said fingerprint comprises a machine readable representation of said previously determined remanent noise, and the step of reading includes the step of reading said fingerprint with a machine.

113. The method of claim 112 wherein said fingerprint comprises an encrypted representation of said previously determined remanent noise, and further comprising the step of decrypting said fingerprint.

114. A method for authenticating an object, said object including at least in part a uniformly manufactured magnetic medium portion, said object having a fingerprint recorded, said fingerprint comprising a previously determined remanent noise for said medium portion, said method comprising the steps of:
determining a remanent noise directly from said medium portion,
reading said fingerprint, and
correlating said determined remanent noise with said fingerprint, said correlation thereby indicating if said object is authentic.

115. The method of claim 114 wherein said fingerprint comprises a machine readable representation of said previously determined remanent noise, and the step of reading includes the step of reading said fingerprint with a machine.

116. The method of claim 115 wherein said fingerprint comprises an encrypted representation of said previously determined remanent noise, and further comprising the step of decrypting said fingerprint.

117. A method for fingerprinting an object for the later determination of its identity, said object including at least in part a magnetic medium portion, said method comprising the steps of determining a remanent noise for a length of no more than about several hundreds of micrometers of said medium portion, said remanent noise comprising said fingerprint, and recording said fingerprint on said object for the later comparison thereof with the later determination of said remanent noise.

118. The method of claim 117 further comprising the step of encrypting said fingerprint prior to recording.

119. A method for fingerprinting an object for the later determination of its identity, said object including at least in part a magnetic medium portion, said method comprising the steps of determining a remanent noise from a magnetic micro-structure for said medium portion, said remanent noise comprising said fingerprint, and recording said fingerprint on said object for the later comparison thereof with the later determination of said remanent noise.

120. The method of claim 119 further comprising the step of encrypting said fingerprint prior to recording.

121. A method for fingerprinting an object for the later determination of its identity, said object including at least in part a uniformly manufactured magnetic medium portion, said method comprising the steps of determining a remanent noise for said medium portion, said remanent noise comprising said fingerprint, and recording said fingerprint on said object for the later comparison thereof with the later determination of said remanent noise.

122. The method of claim 121 further comprising the step of encrypting said fingerprint prior to recording.

* * * * *

UNITED STATES PATENT AND TRADEMARK OFFICE
CERTIFICATE OF CORRECTION

PATENT NO. : 5,365,586
DATED : November 15, 1994
INVENTOR(S) : Ronald S. Indeck, et al.

It is certified that error appears in the above-identified patent and that said Letters Patent is hereby corrected as shown below:

In column 8, line 36, substitute --4-- for "5".

In column 8, line 41, substitute --4-- for "5".

In column 8, line 46, substitute --4-- for "5".

Signed and Sealed this

Eleventh Day of July, 2000

Attest:

Q. TODD DICKINSON

*Attesting Officer*     Director of Patents and Trademarks